United States Patent

Mäusezahl et al.

Patent Number: 4,582,897
Date of Patent: Apr. 15, 1986

[54] AZO DYES

[75] Inventors: Dieter Mäusezahl, Biel-Benken; Rudolf Hurter, Basel; Hansrudolf Schwander, Riehen, all of Switzerland

[73] Assignee: Ciba-Geigy Corporation, Ardsley, N.Y.

[21] Appl. No.: 605,989

[22] Filed: May 2, 1984

Related U.S. Application Data

[63] Continuation of Ser. No. 273,992, Jun. 15, 1981, abandoned.

[30] Foreign Application Priority Data

Jun. 13, 1980 [CH] Switzerland .................. 4571/80

[51] Int. Cl.[4] .............. C09B 29/036; C09B 29/08; C09B 43/02
[52] U.S. Cl. .................. 534/783; 534/775; 534/845
[58] Field of Search ........ 260/165, 205, 207.1, 260/152, 156, 206, 207; 534/775, 783, 845

[56] References Cited

U.S. PATENT DOCUMENTS

| | | | |
|---|---|---|---|
| 2,080,188 | 5/1937 | Scheidegger . | |
| 3,769,279 | 10/1973 | Kuhlthau et al. | 260/165 X |
| 4,046,757 | 9/1977 | Meybeck et al. | 260/205 X |
| 4,048,154 | 9/1977 | Westphal . | |
| 4,105,655 | 8/1978 | Gottschlich et al. | 260/165 X |
| 4,148,791 | 4/1979 | Altermatt | 260/205 X |
| 4,152,114 | 5/1979 | Koller et al. | 260/205 X |
| 4,163,013 | 7/1979 | Hugl et al. | 260/207 X |
| 4,248,774 | 2/1981 | Hugl et al. . | |
| 4,249,275 | 2/1981 | Hugl et al. | 260/165 X |

FOREIGN PATENT DOCUMENTS 0013609 7/1980 European Pat. Off. ......... 260/165

Primary Examiner—Thomas A. Waltz

[57] ABSTRACT

Monoazo dyes of the formula

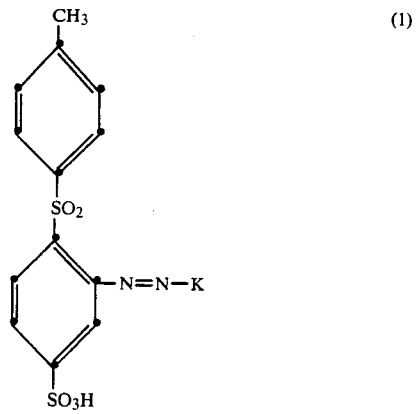

in which K is a radical of the formula

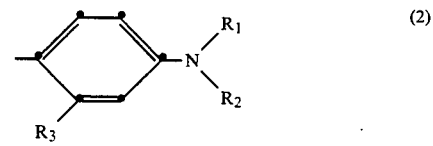

or of the formula

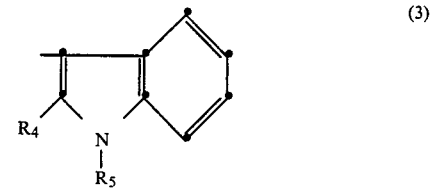

in which $R_1$ and $R_2$ independently of one another is (sic) hydrogen, $C_{1-4}$-alkyl, which can be substituted by halogen, cyano, hydroxyl, carboxyl, sulfo, sulfato, $C_{1-4}$-alkoxy, $C_{1-4}$-alkoxycarbonyl, $C_{1-4}$-alkanoyloxy, phenyl, sulfophenyl and naphthyl, or cyclohexyl, or $C_{1-4}$-alkenyl, which can be substituted by halogen, or phenyl or naphthyl, or in which $R_1$ and $R_2$, together with the nitrogen atom connecting them and where relevant with the inclusion of a further hetero-atom, form a heterocyclic 5-membered or 6-membered ring, $R_3$ is hydrogen, $C_{1-4}$-alkyl, $C_{1-4}$-alkoxy, which can be substituted by hydroxyl and $C_{1-4}$-alkoxy, or $C_{1-4}$-alkanoylamino, or benzoylamino, which can be substituted in the benzene nucleus by methyl, ethyl, methoxy, ethoxy, chlorine, carboxyl and sulfo, or ureido, $C_{1-4}$-alkylsulfonylamino, or phenylsulfonylamino, which can be substituted in the benzene nucleus by methyl, ethyl, methoxy, ethoxy, chlorine, carboxyl and sulfo, or naphthylsulfonylamino, $R_4$ is methyl or phenyl and $R_5$ is hydrogen or $C_{1-8}$-alkyl, and in which, if K is the radical of the formula (2), $R_3$ may not be hydrogen if $R_1$ or $R_2$ is benzyl, produce, on polyamide material, dyeings with good light fastness and wet fastness.

9 Claims, No Drawings

AZO DYES

This application is a continuation of application Ser. No. 273,992, filed June 15, 1981 (now abandoned).

The object on which the present invention was based was to discover novel azo dyes which are suitable for dyeing natural and synthetic polyamides from an aqueous bath, and which furthermore have shades ranging from yellow to red, and also have improved fastness properties, in particular light fastness and wet fastness, and which moreover are particularly suitable for producing combination dyeings.

It has been found that the azo dyes of the formula (1) fulfil the stated requirements.

The present invention thus relates to monoazo dyes of the formula

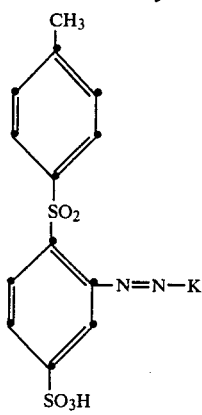

in which K is a radical of the formula

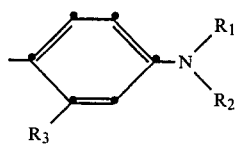

or of the formula

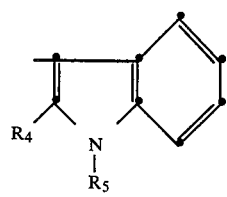

in which $R_1$ and $R_2$ independently of one another are hydrogen, $C_{1-4}$-alkyl, which can be substituted by halogen, cyano, hydroxyl, carboxyl, sulfo, sulfato, $C_{1-4}$-alkoxy, $C_{1-4}$-alkoxycarbonyl, $C_{1-4}$-alkanoyloxy, phenyl, sulfophenyl and naphthyl, or cyclohexyl, phenyl or $C_{1-4}$-alkenyl, which can be substituted by halogen, or naphthyl, or in which $R_1$ and $R_2$, together with the nitrogen atom connecting them and where relevant with the inclusion of a further hetero-atom, form a heterocyclic 5-membered or 6-membered ring, $R_3$ is hydrogen, $C_{1-4}$-alkyl, $C_{1-4}$-alkoxy, which can be substituted by hydroxyl and $C_{1-4}$-alkoxy, or $C_{1-4}$-alkanoylamino, or benzoylamino, which can be substituted in the benzene nucleus by methyl, ethyl, methoxy, ethoxy, chlorine, carboxyl and sulfo, or ureido, $C_{1-4}$-alkylsulfonlylamino, or phenylsulfonylamino, which can be substituted in the benzene nucleus by methyl, ethyl, methoxy, ethoxy, chlorine, carboxyl and sulfo, or naphthylsulfonylamino, $R_4$ is methyl or phenyl and $R_5$ is hydrogen or $C_{1-8}$-alkyl, and in which, if K is the radical of the formula (2), $R_3$ may not be hydrogen if $R_1$ or $R_2$ is benzyl.

In the above definition of $R_1$, $R_2$ and $R_3$, alkyl, alkoxy and alkanoyl groups is to be understood as meaning straight-chain or branched radicals, which can be unsubstituted or substituted in the manner described.

Examples of substituents $R_1$ and $R_2$ are methyl, ethyl, propyl, isopropyl, butyl, isobutyl, sec.-butyl, tert.-butyl, methoxy, ethoxy, propoxy, isopropoxy, butoxy, isobutoxy, sec.-butoxy, tert.-butoxy, chloromethyl, β-chloroethyl, β-bromoethyl, β-cyanoethyl, β-hydroxyethyl, β- or γ-hydroxypropyl, β-carboxyethyl, γ-carboxypropyl, β-sulfoethyl, γ-sulfopropyl, δ-sulfo-n-butyl, β-methyl-γ-sulfopropyl, β-sulfatoethyl, β-methoxyethyl, β-ethoxyethyl, β-methoxycarbonylethyl, β-acetoxyethyl, benzyl, phenethyl, naphth-1-ethyl, cyclohexyl, β-hydroxy-γ-sulfopropyl, β-hydroxybutyl, β-hydroxy-γ-methoxypropyl, β-propionyloxyethyl, propenyl, γ-chloropropenyl and sulfobenzyl. A phenyl or naphthyl radical contained in $R_1$ and $R_2$ can have the ring substituents customary in azo dyes. Such substituents, especially on the phenyl radical, are, for example, sulfo, halogen, such as fluorine, chlorine or bromine, nitro, $C_{1-4}$-alkyl groups, such as methyl, and $C_{1-4}$-alkoxy groups, such as methoxy and ethoxy.

The radical of a 5-membered or 6-membered heteroring formed by $R_1$ and $R_2$, together with the nitrogen atom connecting them and, where relevant, with the inclusion of a further hetero-atom, is, in particular, the pyrrolidino, piperidino or morpholino group.

Examples of the substituent $R_3$ are methyl, ethyl, propyl, isopropyl, butyl, isobutyl, sec.-butyl, tert.-butyl, methoxy, ethoxy, propoxy, isopropoxy, butoxy, isobutoxy, sec.-butoxy, tert.-butoxy, β-hydroxyethoxy, β-hydroxy-n-propoxy, β-hydroxy-n-butoxy, β-ethoxyethoxy, β-hydroxy-γ-methoxypropoxy, acetylamino, propionylamino, benzoylamino, 4'-chlorobenzoylamino, ureido, methylsulfonylamino, phenylsulfonylamino, 4'-methylphenylsulfonylamino, 1-naphthylsulfonylamino, 4'-methylbenzoylamino and 2'-carboxybenzoylamino.

$R_4$ is methyl or the unsubstituted phenyl group.

Examples of the substituent $R_5$ are methyl, ethyl, propyl, isopropyl, butyl, isobutyl, sec.-butyl, tert.-butyl, pentyl, hexyl, heptyl and octyl.

Monoazo dyes of the formula (1) in which K is the radical of the formula (2), in which $R_1$ and $R_2$ independently of one another is (sic) hydrogen, $C_{1-4}$-alkyl, which can be substituted by cyano, hydroxyl, sulfo, sulfato, $C_{1-4}$-alkoxy, $C_{1-4}$-alkoxycarbonyl, $C_{1-4}$-alkanoyloxy, phenyl or sulfophenyl, or cyclohexyl, or $C_{1-4}$-alkenyl, which can be substituted by halogen, or in which $R_1$ and $R_2$, together with the nitrogen atom connecting them, form a morpholine ring, and $R_3$ is hydrogen, $C_{1-4}$-alkyl, $C_{1-4}$-alkoxy, which can be substituted by hydroxyl and $C_{1-4}$-alkoxy, or $C_{1-4}$-alkanoylamino, or benzoylamino, which can be substituted in the benzene nucleus by methyl, chlorine and carboxyl, or ureido, $C_{1-4}$-alkylsulfonylamino, or phenylsulfonylamino, which can be substituted in the benzene nucleus by methyl, and in which $R_3$ may not be hydrogen if $R_1$ or $R_2$ is benzyl, are preferred.

Monoazo dyes of the formula (1) in which K is the radical of the formula (3), in which $R_4$ is methyl or phenyl and $R_5$ is hydrogen, methyl or octyl, are also preferred.

Monoazo dyes of the formula (1) in which K is a radical of the formula (2), in which $R_1$ and $R_2$ independently of one another is (sic) hydrogen, methyl, ethyl, $\beta$-hydroxyethyl, $\beta$-cyanoethyl, $\beta$-sulfoethyl, $\beta$-sulfatoethyl, $\gamma$-sulfopropyl, $\beta$-hydroxy-$\gamma$-sulfopropyl, propenyl, $\gamma$-chloropropenyl, $\beta$-hydroxybutyl, $\beta$-hydroxy-$\gamma$-methoxypropyl, $\beta$-acetoxyethyl, $\beta$-methoxycarbonylethyl, $\beta$-propionyloxyethyl, cyclohexyl, benzyl or sulfobenzyl, or in which $R_1$ and $R_2$, together with the nitrogen atom connecting them, form a morpholine ring, and $R_3$ is methyl, ethyl, methoxy, ethoxy, $\beta$-hydroxyethoxy, $\beta$-hydroxypropoxy, $\beta$-hydroxy-$\gamma$-methoxypropoxy, $\beta$-hydroxybutoxy, acetylamino, propionylamino, benzoylamino, methylbenzoylamino, chlorobenzoylamino, carboxybenzoylamino, methylsulfonylamino, phenylsulfonylamino, methylphenylsulfonylamino or ureido, are particularly preferred.

Valuable representatives of the classes defined above are the monoazo dyes of the formulae

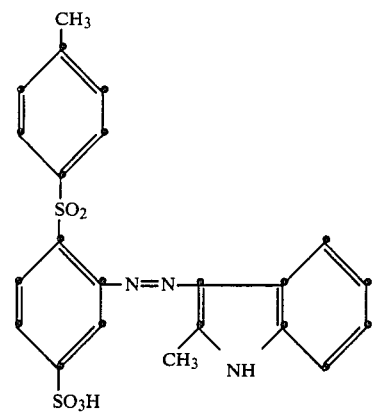

(4)

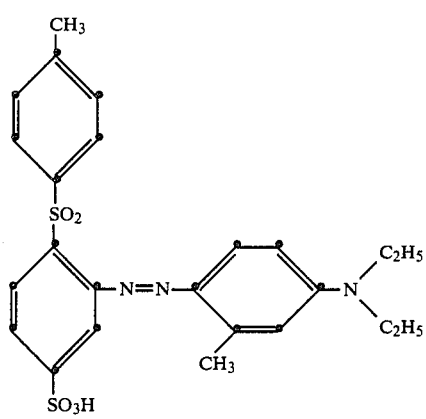

(5)

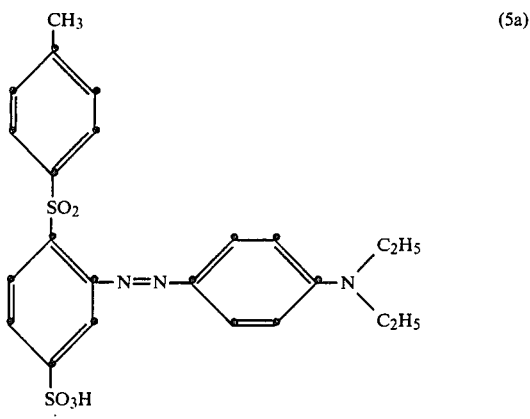

(5a)

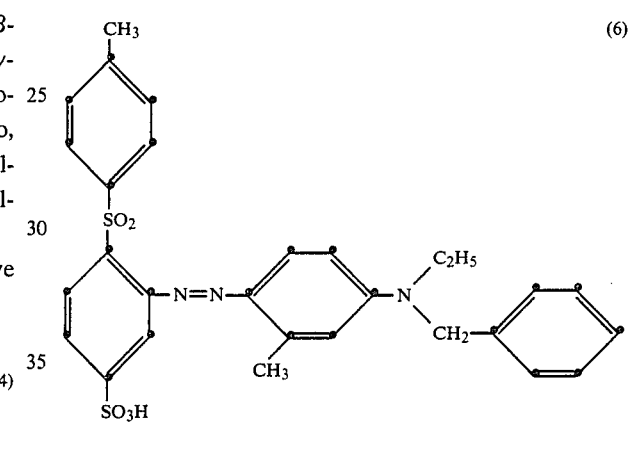

(6)

and

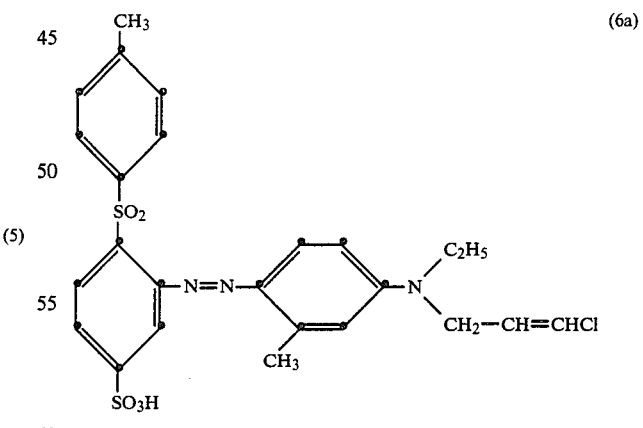

(6a)

The invention also relates to a process for the preparation of the monoazo dyes of the formula (1). The process comprises diazotising a diazo component of the formula

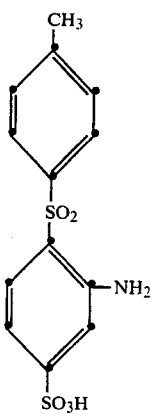

and coupling the product to a coupling component of the formula

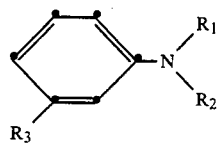

or of the formula

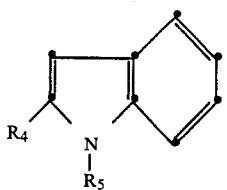

in which $R_1$, $R_2$, $R_3$, $R_4$ and $R_5$ are as defined under formula (1).

The diazo components of the formula (7) are as a rule diazotised by the action of nitrous acid in aqueous-mineral acid solution at a low temperature, and the product is coupled to the coupling components of the formula (8) or (9) at acid, neutral or alkaline pH values.

Coupling components of the formula (8) in which $R_1$ and $R_2$ independently of one another is (sic) hydrogen, $C_{1-4}$-alkyl, which can be substituted by cyano, hydroxyl, sulfo, sulfato, $C_{1-4}$-alkoxy, $C_{1-4}$-alkoxycarbonyl, $C_{1-4}$-alkanoyloxy, phenyl or sulfophenyl, or cyclohexyl, or $C_{1-4}$-alkenyl, which can be substituted by halogen, or in which $R_1$ and $R_2$, together with the nitrogen atom connecting them, form a morpholine ring, and $R_3$ is hydrogen, $C_{1-4}$-alkyl, $C_{1-4}$-alkoxy, which can be substituted by hydroxyl and $C_{1-4}$-alkoxy, or $C_{1-4}$-alkanoylamino, or benzoylamino, which can be substituted in the benzene nucleus by methyl, chlorine and carboxyl, or ureido, $C_{1-4}$-alkylsulfonylamino or phenylsulfonylamino, which can be substituted in the benzene nucleus by methyl, and in which $R_3$ may not be hydrogen if $R_1$ or $R_2$ is benzyl, are preferably used.

Coupling components of the formula (9) in which $R_4$ is methyl or phenyl and $R_5$ is hydrogen, methyl or octyl are also preferably used.

Coupling components of the formula (8) in which $R_1$ and $R_2$ independently of one another is (sic) hydrogen, methyl, ethyl, β-hydroxyethyl, β-cyanoethyl, β-sulfoethyl, β-sulfatoethyl, γ-sulfopropyl, β-hydroxy-γ-sulfopropyl, propenyl, γ-chloropropenyl, β-hydroxybutyl, β-hydroxy-γ-methoxypropyl, β-acetoxyethyl, β-methoxycarbonylethyl, β-propionyloxyethyl, cyclohexyl, benzyl or sulfobenzyl, or in which $R_1$ and $R_2$, together with the nitrogen atom connecting them, form a morpholine ring, and $R_3$ is methyl, ethyl, methoxy, ethoxy, β-hydroxyethoxy, β-hydroxypropoxy, β-hydroxy-γ-methoxypropoxy, β-hydroxybutoxy, acetylamino, propionylamino, benzoylamino, methylbenzoylamino, chlorobenzoylamino, carboxybenzoylamino, methylsulfonylamino, phenylsulfonylamino, methylphenylsulfonylamino or ureido, are used in particular.

The monoazo dye of the formula (4) is prepared by diazotising 2-amino-4'-methyl-diphenylsulfone-4-sulfonic acid and coupling the product to 2-methylindole.

The preparation of the monoazo dye of the formula (5) comprises diazotising 2-amino-4'-methyl-diphenylsulfone-4-sulfonic acid and coupling the product to N,N-diethyl-m-toluidine.

The preparation of the monoazo dye of the formula (5a) comprises diazotising 2-amino-4'-methyl-diphenylsulfone-4-sulfonic acid and coupling the product to N,N-diethylaniline.

The preparation of the monoazo dye of the formula (6) comprises diazotising 2-amino-4'-methyl-diphenylsulfone-4-sulfonic acid and coupling the product to N-ethyl-N-benzyl-m-toluidine.

The preparation of the monoazo dye of the formula (6a) comprises diazotising 2-amino-4'-methyl-diphenylsulfone-4-sulfonic acid and coupling the product to N-ethyl-N-γ-chloropropenyl-3-methylaniline.

The diazo component of the formula (7) is known and is prepared by known methods.

The following compounds are examples of the large number of possible coupling components: aniline, dimethylaniline, diethylaniline, 3-methyl-dimethylaniline, 3-methyl-diethylaniline, 3-acetylamino- or 3-methoxycarbonylamino- or 3-ureido-dimethylaniline, 3-methoxydiethylaniline, 3-methoxyaniline, N-ethyl-N-(β-cyanoethyl)-aniline, N-ethyl-N-(β-hydroxyethyl)-aniline, N-ethyl-N-(β-acetoxyethyl)-aniline, N,N-dibutylaniline, 3-acetylamino-N,N-diethylaniline, N-methyl-N-(β-cyanoethyl)-aniline, 3-methyl-N,N-di-(β-cyanoethyl)-aniline, 3-ethyl-N,N-dimethylaniline, 3-methyl-N-ethyl-N-benzylaniline, N,N-di-n-propylaniline, 3-acetylamino-N,N-di-(β-hydroxyethyl)-aniline, 3-methyl-N,N-di-(β-acetoxyethyl)-aniline, N-ethyl-N-(β-chloroethyl)-aniline, 3-acetylamino-N-benzylaniline, 3-acetylamino-N-(β-acetoxyethyl-N-benzylaniline, 3-methyl-N-ethyl-N-(β-cyanoethyl)-aniline, 3-propionylamine-N,N-dimethylaniline (sic), 3-benzoylamino-N,N-dimethylaniline, 3-acetylamino-N-(γ-phenoxy-β-hydroxy-n-propyl)-aniline, 3-ureidoaniline, N-ethyl-N-(3'-sulfobenzyl)-aniline, 3-methyl-N-ethyl-N-(β-sulfoethyl)-aniline, 3-benzoylamino-N,N-diethylaniline, 3-methyl-N,N-di-(β-hydroxyethyl)-aniline, 3-methyl-N-methyl-N-benzylaniline, 3-propionylamino-N,N-diethylaniline, 3-(4'-chlorobenzoylamino)-N,N-diethylaniline, 3-acetylamino-N-ethyl-N-benzylaniline, 3-(4'-methylphenylsulfonylamino)-N,N-diethylaniline, 3-methyl-N-ethyl-N-benzylaniline, 3-methoxy-N,N-dimethylaniline, 3-methyl-N-ethyl-N-γ-chloropropenylaniline, 3-methyl-N-cyclohexylaniline, 3-methyl-N-methyl-N-cyclohexylaniline, 3-methyl-N-ethyl-N-propenylaniline, 3-methyl-N,N-dipropenylaniline, 3-ethyl-N,N-dipropenylaniline, 3- methyl-N-ethyl-N-(β-hydroxybutyl)-aniline, 3-methyl-N,N-di-(β-methoxycarbonylethyl)-aniline, 3-methyl-N,N-morpholinoaniline, 3-methyl-N-ethyl-N-(γ-sulfopropyl)-aniline, 3-methyl-N-ethyl-N-(β-hydroxy-γ-sulfopropyl)-aniline, 3-methyl-N-ethyl-N-(β-sulfatoethyl)-aniline, 3-methyl-N-ethyl-N-(3'-sulfobenzyl)-aniline, 3-acetylamino-N-methyl-N-(β-hydroxyethyl)-aniline, 3-acetylamino-N-methyl-N-(β-cyanoethyl)-aniline, 3-acetylamino-N,N-di-(β-cyanoethyl)-aniline, 3-acetylamino-N-methyl-N-ethylcarbonyloxyethylaniline, 3-acetylamino-N-methyl-N-(β-hydroxy-γ-methoxypropyl)-aniline, 3-acetylamino-N,N-dipropenylaniline, 3-acetylamino-N-cyclohexylaniline, 3-propionylamino-N-cyclohexylaniline, 3-propionylamino-N,N-dipropenylaniline, 3-(4'-methylbenzoylamino)-N,N-diethylaniline, 3-(2'-carboxybenzoylamino)-N,N-diethylaniline, 3-methylsulfonylamino-N,N-diethylaniline, 3-methylsulfonylamino-N-ethyl-N-benzylaniline, 3-phenylsulfonylamino-N,N-diethylaniline, 3-ureido-N,N-dipropenylaniline, 3-ureido-N-ethyl-N-(β-sulfoethyl)-aniline, 3-acetylamino-N-ethyl-N-(β-hydroxy-γ-sulfopropyl)-aniline, 3-acetylamino-N-ethyl-N-(3'-sulfobenzyl)-aniline, 3-methoxy-N-ethyl-N-(β-hydroxyethyl)-aniline, 3-methoxy-N,N-di-(β-cyanoethyl)-aniline, 3-methoxy-N,N-dipropenylaniline, 3-methoxy-N-cyclohexylaniline, 3-methoxy-N-methyl-N-cyclohexylaniline, 3-ethoxy-N,N-di-(β-hydroxyethyl)-aniline, 3-(β-hydroxyethoxy)-N-ethyl-N-(β-hydroxyethyl)-aniline, 3-(β-hydroxyethoxy)-N-ethyl-N-(β-cyanoethyl)aniline, 3-(βhydroxyethoxy)-N-ethyl-N-benzylaniline, 3-(β-hydroxypropoxy)-N,N-di-(β-hydroxyethyl)-aniline, 3-(β-hydroxypropoxy)-N,N-dipropenylaniline, 3-methoxy-N-ethyl-N-(β-sulfoethyl)-aniline, 3-methoxy-N-ethyl-N-(β-hydroxy-γ-sulfopropyl)-aniline, 3-methoxy-N-ethyl-N-(β-sulfatoethyl)-aniline, 3-methoxy-N-ethyl-N-(3'-sulfobenzyl)-aniline, 3-β-hydroxyethoxy-N,N-dimethylaniline, 3-β-hydroxy-n-propoxy-N,N-dimethylaniline, 3-β-hydroxy-n-butoxy-N,N-dimethylaniline, 3-β-hydroxy-γ-methoxy-n-propoxy-N,N-dimethylaniline, 3-methoxy-N-methyl-N-benzylaniline, 3-ethoxy-N,N-diethylaniline, 2-methylindole, 2-phenylindole, 2-methyl-N-methylindole and 2-methyl-N-n-octylindole.

The dyes of the formula (1) are suitable for dyeing and printing materials containing amide groups, such as textile fibres and textile filaments and fabrics of wool, silk and polyurethane fibres, but especially for dyeing and printing synthetic polyamide, the usual dyeing processes being used.

The dyes are distinguished by their brilliance and their tinctorial strength, their resistance to formaldehyde and generally good fastness properties, such as light fastness, fastness to rubbing and acid and alkaline fastness, and, depending on the nature of the substitution of the coupling component, by the production of deep shades, by good wet fastness properties, in particular fastness to washing, water, hot water and perspiration, or by good migration, the ability to cover streakiness resulting from the material and good levelling properties when mixed with other dyes for trichromatic dyeing.

In the following examples, the parts are by weight. The temperatures are degrees Centigrade. The relationship between parts by weight and parts by volume is the same as that between gram and cubic centimeter.

EXAMPLE 1

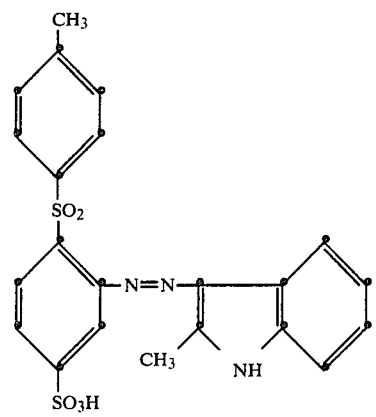

52.8 g of 2-amino-4'-methyl-diphenylsulfone-4-sulfonic acid are suspended, in moistened form, in 250 ml of water. 25 ml of 10N hydrochloric acid are then added, and 25 ml of 4N nitrite solution are added dropwise at 10° to 15°. After one hour, a slight excess of nitrite is destroyed with sulfamic acid. 13.5 g of 2-methylindole are now dissolved in 10 ml of hydrochloric acid at 40° and the solution is added dropwise to the above diazo suspension, with good stirring. The coupling mixture is stirred for 10 hours, and a pH value of 4 is established by addition of crystalline sodium acetate. The yellow suspension is filtered and the residue is washed with 200 ml of 5% sodium chloride solution, and dried in vacuo at 60° to 70°. 49.8 g of dry dye which is very soluble in water at pH 7 are obtained.

When used for dyeing polyamide material from a weakly acid bath, the dye gives brilliant golden yellow dyeings with very good light fastness.

The 2-methylindole in the above batch is replaced by 2-phenylindole. A dye which has similar properties but is less soluble in water is obtained.

EXAMPLE 2

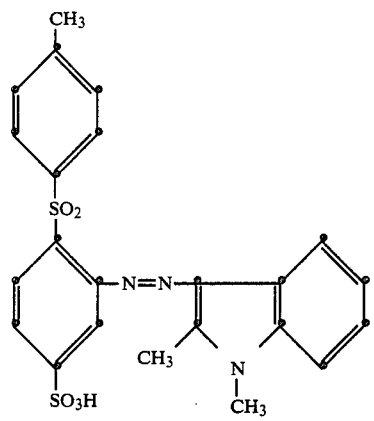

42 g of the dye according to Example 1 are suspended in 62 g of dimethylmethanephosphate. 26.5 g of anhydrous sodium carbonate are added to the suspension and the heterogeneous mixture is stirred at 120° to 125° for 5 hours. Alkylation is complete when the dye according to Example 1 can no longer be detected in a thin layer chromatogram. 100 ml of water at a temperature of about 80° are then added to the reaction mixture at 95°.

A clear solution forms. After addition of 20 g of sodium chloride, the dye crystallises out. The dye is filtered off, washed with 10% brine solution and dried. 40.3 g of a yellow dye powder are obtained. When used for dyeing polyamide from a weakly acid bath, the dye gives brilliant golden yellow dyeings with very good light fastness. The dye is also distinguished by a good solubility in water.

EXAMPLE 3

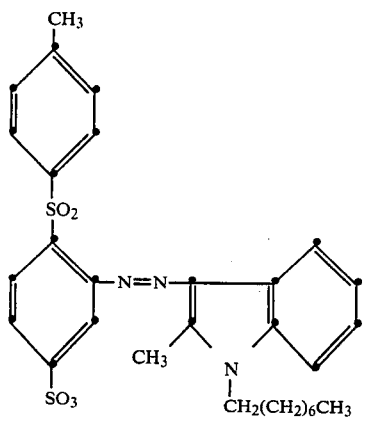

6.54 g of 2-amino-4'-methyl-diphenylsulfone-4-sulfonic acid are dissolved in 150 ml of water at 40°–45°. 5 ml of 4N sodium nitrite and 50 g of ice are added, and 11 ml of an approximately 31% solution of naphthalene-1-sulfonic acid are then added to the mixture. After 15 minutes, a slight excess of nitrite is destroyed with sulfamic acid.

4.86 g of 2-methyl-N-octyl-indole are dissolved in 6 ml of 10N hydrochloric acid and 2.5 ml of alcohol and the solution is added dropwise to the diazonium salt suspension prepared above. After 16 hours, the dye has precipitated completely and is filtered off and washed with 100 ml of water. The material on the filter is stirred in 100 ml of water to form a homogeneous mass, which is then adjusted to a constant pH of 7 with 2N sodium hydroxide solution. The dye is precipitated with dilute sodium chloride solution and, after some time, is filtered off cold, and dried in vacuo at 60°–70°.

8.93 g of an intensely reddish-tinged yellow dye powder are obtained.

EXAMPLE 4

34.5 g of 2-amino-4'-methyl-diphenylsulfone-4-sulfonic acid are dissolved in 150 ml of water at 80° in a medium slightly alkaline to Brilliant Yellow, and 14.62 ml of 50% sodium nitrite solution are added. This solution is allowed to run into a mixture consisting of 210 ml of ice-water and 26.5 g of 37% hydrochloric acid. To bring the diazotisation to completion, the mixture is stirred for a further hour at about 15°. Thereafter, a solution which has been warmed to about 50° and consists of 60 ml of isopropanol, containing 20.9 g of the coupling component of the formula

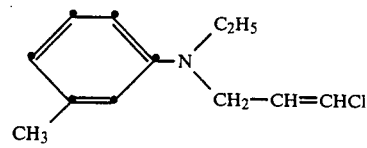

(prepared by reaction of N-ethyl-m-toluidine with 1,3-dichloropropene in isopropanol in the presence of magnesium oxide), and 15 ml of water, is added to the resulting diazo suspension. The mixture is stirred at a temperature of 20°–25° until the coupling is complete, after which it is warmed and adjusted to a pH value of 7 by addition of sodium hydroxide solution. 10% by volume of sodium chloride are added at 70° and the mixture is allowed to cool, with stirring, whereupon the sodium salt of the dye of the formula

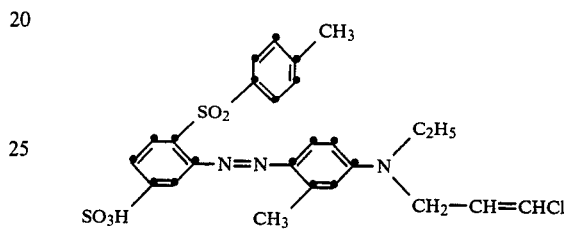

separates out. The dye is isolated by filtration on a suction filter at room temperature, and is then dried at 70° in vacuo. The dye is a red powder which dissolves in water giving an orange-red coloured solution. The orange dyeings which can be obtained on polyamide using this dye have good fastness properties, and in particular they have good light and wet fastness. The dye thus obtained also has good solubility properties.

EXAMPLE 5

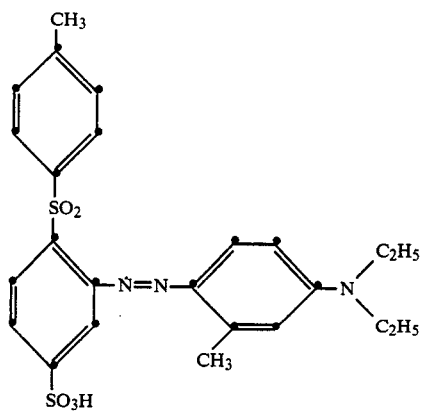

42.0 g of 2-amino-4'-methyl-diphenylsulfone-4-sulfonic acid are dissolved in 200 ml of water at pH 8.5 whilst being warmed to 60°, and the solution is then cooled to 30°. 12.5 ml of 4N nitrite solution are now added, and the resulting solution is added dropwise to a mixture of 200 g of ice and 15 ml of 10N hydrochloric acid. After 30 minutes, a slight excess of nitrite is destroyed with sulfamic acid. The diazo suspension formed is poured into a solution of 8.3 g of 3-methyl-N,N-diethylaniline in 100 ml of 1N hydrochloric acid, and the coupling mixture is kept at a pH value of 5 to 6 for 12 hours with 103 ml of 2N sodium hydroxide solution. The dye which has precipitated is filtered off, and washed with 100 ml of 2% sodium chloride solution. After the residue has been dried at 60° to 70° in vacuo, 28 g of a brown powder are obtained. When used for dyeing polyamide material from a weakly acid bath, the dye gives a brilliant scarlet-red dyeing.

The procedure described in Example 5 is repeated, using a coupling component of the formula

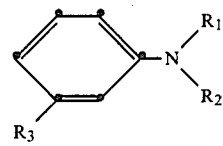

in which $R_1$, $R_2$ and $R_3$ are as defined in columns 2 to 4 of the table which follows. Valuable water-soluble dyes which dye polyamide material or woollen material in the shades given in the last column are likewise obtained. The dyes have a good build-up capacity and good fastness properties.

TABLE 1

| Example | $R_1$ | $R_2$ | $R_3$ | Colour shade on Polyamide | Wool |
|---|---|---|---|---|---|
| 1 | —CH$_3$ | —CH$_3$ | —CH$_3$ | scarlet | |
| 2 | —CH$_2$—CH$_2$—OH | —CH$_2$—CH$_2$—OH | " | scarlet | |
| 3 | —C$_2$H$_5$ | —CH$_2$—CH$_2$—CN | " | orange | |
| 4 | —C$_2$H$_5$ | —CH$_2$—C$_6$H$_5$ | " | scarlet | |
| 5 | —CH$_3$ | " | " | " | |
| 6 | —H | cyclohexyl | " | " | |
| 7 | —CH$_3$ | cyclohexyl | " | " | |
| 8 | —C$_2$H$_5$ | —CH$_2$—CH=CH$_2$ | " | " | |
| 9 | —CH$_2$CH=CH$_2$ | " | " | " | |
| 10 | " | " | —C$_2$H$_5$ | " | |
| 11 | —CH$_2$—CH$_2$—CN | —CH$_2$—CH$_2$—CN | —CH$_3$ | orange | |
| 12 | —C$_2$H$_5$ | —CH$_2$—CH(OH)—CH$_2$—CH$_3$ | " | scarlet | |
| 13 | —CH$_2$—CH$_2$—C(=O)—O—CH$_3$ | —CH$_2$—CH$_2$—C(=O)—O—CH$_3$ | " | " | |
| 14 | —CH$_2$—CH$_2$—O—C(=O)—CH$_3$ | —CH$_2$—CH$_2$—O—C(=O)—CH$_3$ | " | " | |
| 15 | morpholino | | " | " | |
| 16 | —C$_2$H$_5$ | —CH$_2$—CH$_2$—SO$_3$H | " | | scarlet |
| 17 | " | —CH$_2$—CH$_2$—CH$_2$—SO$_3$H | " | | " |
| 18 | " | —CH$_2$—CH(OH)—CH$_2$—SO$_3$H | " | | " |
| 19 | " | —CH$_2$—CH$_2$—O—SO$_3$H | " | | " |

TABLE 1-continued

| Example | R₁ | R₂ | R₃ | Colour shade on Polyamide | Wool |
|---|---|---|---|---|---|
| 20 | " | 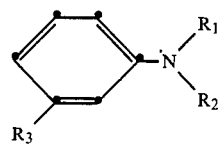 | " | " | " |

EXAMPLE 6

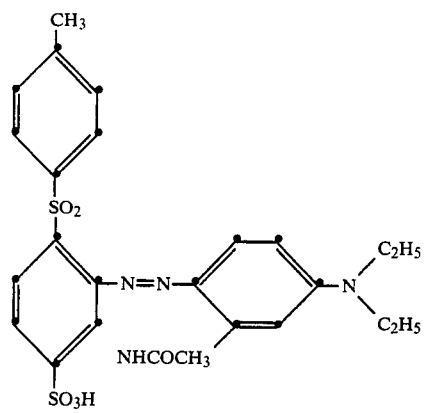

8.16 g of 2-amino-4'-methyl-diphenylsulfone-4-sulfonic acid (80.1%) are dissolved in 150 ml of water at 45° under neutral conditions. 5 ml of 4N nitrite solution and 50 g of ice are then added. 11 ml of 4N α-naphthalenesulfonic acid solution are then poured into the solution, and the mixture is stirred at 18° for 20 minutes. A slight excess of nitrite is destroyed with sulfamic acid. 4.12 g of 3-acetylamino-N,N-diethylaniline are now dissolved in 100 ml of water, containing 20 ml of 1N hydrochloric acid, at 25°. The resulting solution is added dropwise to the above diazo suspension in the course of 15 minutes. The pH value of the coupling mixture is kept at 2.5 for 2 hours with 4N sodium acetate solution, after which the coupling has ended. Sodium chloride is added to the resulting suspension and the pH is adjusted to 9 with 10N sodium hydroxide solution. The dye precipitate is filtered off and washed with 100 ml of water. After the residue has been dried in vacuo at 70° to 80°, 9.7 g of a brown powder are obtained. When used for dyeing polyamide material from a weakly acid bath, the dye gives brilliant orange-red dyeings.

The procedure described in Example 6 is repeated, using a coupling component of the formula in which $R_1$, $R_2$ and $R_3$ are as defined in columns 2 to 4 in the table which follows. Valuable water-soluble dyes which dye polyamide material or woollen material in the shades given in the last column are likewise obtained. The dyes have a good build-up capacity and good fastness properties.

TABLE 2

| Example | R₁ | R₂ | R₃ | Colour shade on Polyamide | Wool |
|---|---|---|---|---|---|
| 1 | —CH₃ | —CH₃ | —NH—C(=O)—CH₃ | scarlet | |
| 2 | " | —CH₂—CH₂—OH | " | " | |
| 3 | " | —CH₂—CH₂—CN | " | | reddish-tinged orange |
| 4 | —CH₂—CH₂—CN | " | " | | orange |
| 5 | —CH₃ | —CH₂—CH₂—O—C(=O)—C₂H₅ | " | scarlet | |
| 6 | " | —CH₂—CH(OH)—CH₂—O—CH₃ | " | " | |
| 7 | —CH₂—CH=CH₂ | —CH₂—CH=CH₂ | " | " | |
| 8 | —C₂H₅ | —CH₂—⌬ | " | " | |

TABLE 2-continued

| Example | R₁ | R₂ | R₃ | Colour shade on Polyamide | Wool |
|---|---|---|---|---|---|
| 9 | —H | ⟨phenyl-H⟩ | " | " | " |
| 10 | —H | " | —NH—C(=O)—C₂H₅ | " | " |
| 11 | —CH₂—CH=CH₂ | —CH₂—CH=CH₂ | " | " | " |
| 12 | —C₂H₅ | —C₂H₅ | " | " | " |
| 13 | " | " | —NH—C(=O)—phenyl | " | " |
| 14 | " | " | —NH—C(=O)—(4-CH₃-phenyl) | " | " |
| 15 | " | " | —NH—C(=O)—(4-Cl-phenyl) | " | " |
| 16 | " | —C₂H₅ | —NH—C(=O)—(2-HO₂C-phenyl) | " | " |
| 17 | " | " | —NH—SO₂—CH₃ | " | " |
| 18 | " | —CH₂—phenyl | " | " | " |
| 19 | " | —C₂H₅ | —NH—SO₂—phenyl | " | " |

TABLE 2-continued

| Example | $R_1$ | $R_2$ | $R_3$ | Colour shade on Polyamide | Wool |
|---------|-------|-------|-------|---------------------------|------|
| 20 | " | " | 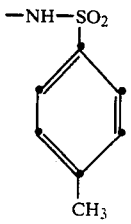 —NH—SO$_2$—C$_6$H$_4$—CH$_3$ | " | |
| 21 | —H | —H | —NH—CO—NH$_2$ | reddish-tinged orange | |
| 22 | —CH$_3$ | —CH$_3$ | " | reddish-tinged orange | |
| 23 | —CH$_2$—CH=CH$_2$ | —CH$_2$—CH=CH$_2$ | " | reddish-tinged orange | |
| 24 | —C$_2$H$_5$ | —CH$_2$—CH$_2$—SO$_3$H | —NH—C(=O)—CH$_3$ | | scarlet |
| 25 | " | —CH$_2$—CH(OH)—CH$_2$—SO$_3$H | " | | " |
| 26 | " | 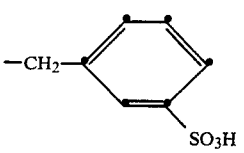 —CH$_2$—C$_6$H$_4$—SO$_3$H | " | | " |

EXAMPLE 7

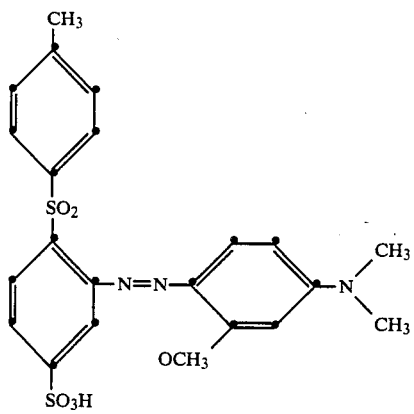

13.2 g of 2-amino-4'-methyl-diphenylsulfone-4-sulfonic acid (49.6%) are suspended in 150 ml of water and 14 ml of 4N α-naphthalenesulfonic acid, and 5 ml of 4N nitrite solution are added dropwise to this mixture at 10° to 20° in the course of one hour. The resulting suspension is stirred for a further hour, and a slight excess of nitrite is then destroyed with sulfamic acid. A solution of 4 g of 3-methoxy-N,N-dimethylaniline in 25 ml of acetone is now prepared, and the above diazo suspension is poured into the acetone solution. The pH value of the mixture is raised to 6 with 9 ml of 2N sodium hydroxide solution in the course of 30 minutes, and is then kept constant. After the mixture has been stirred at 25° for 12 hours, the dye is precipitated by addition of 5 ml of 10N hydrochloric acid, and is filtered off. For purification, the residue on the filter is dissolved at pH 12 in 300 ml of water and 55 ml of 2N sodium hydroxide solution and the solution is then clarified by filtration and the filtrate is adjusted to a pH value of 5 with 50 ml of 2N hydrochloric acid. After one hour, the resulting suspension is filtered and the residue on the filter is washed with 100 ml of 5% sodium chloride solution. After the residue has been dried in vacuo at 70° to 80°, 3.7 g of a brown powder are obtained. When using for dyeing polyamide material from a weakly acid bath, the dye gives brilliant orange-red dyeings.

The procedure described in Example 7 is repeated, using a coupling component of the formula

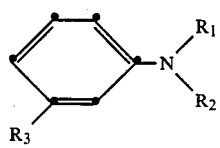

in which $R_1$, $R_2$ and $R_3$ are as defined in columns 2 to 4 of Table 3 which follows. Valuable water-soluble dyes which dye polyamide material or woollen material in the shades given in the last column are likewise obtained. The dyes have a good build-up capacity and good fastness properties.

TABLE 3

| Example | R₁ | R₂ | R₃ | Colour shade on Polyamide | Wool |
|---|---|---|---|---|---|
| 1 | —C$_2$H$_5$ | —C$_2$H$_5$ | —O—CH$_3$ | orange | |
| 2 | " | —CH$_2$—CH$_2$—OH | " | " | |
| 3 | —CH$_2$—CH$_2$—CN | —CH$_2$—CH$_2$—CN | " | reddish-tinged yellow | |
| 4 | —CH$_2$—CH=CH$_2$ | —CH$_2$—CH=CH$_2$ | " | orange | |
| 5 | —CH$_3$ | —CH$_2$—C$_6$H$_5$ | " | " | |
| 6 | —H | —C$_6$H$_5$ (H) | " | " | |
| 7 | —CH$_3$ | " | " | " | |
| 8 | —CH$_2$—CH$_2$—OH | —CH$_2$—CH$_2$—OH | —O—C$_2$H$_5$ | " | |
| 9 | C$_2$H$_5$ | —C$_2$H$_5$ | " | " | |
| 10 | " | —CH$_2$—CH$_2$—OH | —O—CH$_2$—CH$_2$—OH | " | |
| 11 | " | —CH$_2$—CH$_2$—CN | " | yellowish-tinged orange | |
| 12 | " | —CH$_2$—C$_6$H$_5$ | " | orange | |
| 13 | —CH$_3$ | —CH$_3$ | " | " | |
| 14 | " | " | —O—CH$_2$—CH(OH)—CH$_3$ | " | |
| 15 | —CH$_2$—CH$_2$—OH | —CH$_2$—CH$_2$—OH | —O—CH$_2$—CH(OH)—CH$_3$ | orange | |
| 16 | —CH$_2$—CH=CH$_2$ | —CH$_2$—CH=CH$_2$ | " | " | |
| 17 | —CH$_3$ | —CH$_3$ | —O—CH$_2$—CH(OH)—C$_2$H$_5$ | " | |
| 18 | " | " | —O—CH$_2$—CH(OH)—CH$_2$—O—CH$_3$ | " | |
| 19 | —C$_2$H$_5$ | —CH$_2$—CH$_2$—SO$_3$H | —O—CH$_3$ | | orange |
| 20 | " | —CH$_2$—CH(OH)—CH$_2$—SO$_3$H | " | | " |
| 21 | " | —CH$_2$—CH$_2$—O—SO$_3$H | " | | " |
| 22 | " | —CH$_2$—C$_6$H$_5$ | " | | " |

EXAMPLE 8

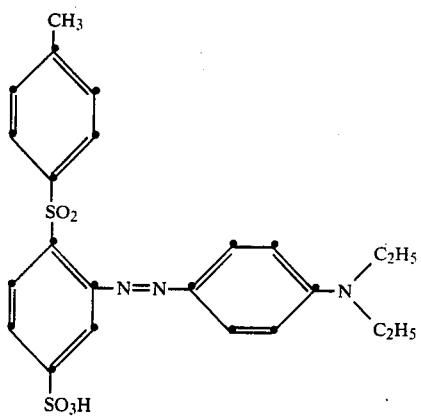

7.62 g of 2-amino-4'-methyl-diphenylsulfone-4-sulfonic acid are dissolved in 40 ml of water at 55° and at pH 8. After addition of 5 ml of 10N hydrochloric acid and ice, the amine is diazotised with 5 ml of 4N sodium nitrite at a temperature of 5° to 8°. After 20 minutes, a slight excess of nitrite is destroyed. 2.98 g of N,N-diethylaniline are now added dropwise, and the pH value is raised gradually from 5 to 7.5. The product which has precipitated out is filtered off at room temperature and, after being washed with 2.5% sodium chloride solution, is dried at 100° to 110°.

9.74 g of a dye which dyes polyamide materials in brilliant orange shades are obtained.

Dyeing instruction I 10 parts of Helanca tricot are dyed in 500 parts of an aqueous liquor which contains 2 g/l of ammonium acetate and is adjusted to pH 5 with acetic acid. The content of dye from Example 1 or 5 is 1%, based on the fibre weight. The dyeing time is 30 to 90 minutes, at a temperature of 98°. The dyed piece of Helanca is then taken out of the bath and rinsed and dried in the usual way. A piece of fabric which has been dyed completely levelly and has a bright shade and good overall fastness properties and exhibits no streakiness caused by the material is obtained.

Dyeing instruction II 10 parts of Helanca tricot are dyed in 500 parts of an aqueous liquor which contains 1 g/l of monosodium phosphate and is adjusted to pH 6 with disodium phosphate. The content of dye from Table 1, Example 4, or Table 2, Example 13, is 2.2%, based on the fibre weight. The dyeing time is 30 to 90 minutes, at a temperature of 98°. The dyed piece of Helanca is then taken out of the bath and rinsed and dried in the usual way. A deep-coloured piece of fabric and (sic) which has a bright shade, good overall fastness properties and, in particular, good wet fastness properties is obtained.

Dyeing instruction III (Exhaust carpet-dyeing method)

A beam dyeing apparatus (laboratory piece-dyeing apparatus, Model 10 of Rudolf Then), consists in its main parts of the horiziontal dyeing kier, with cooling jacket, which is linked to the expansion tank via its special reversal pump so as to form a circulation system.

A goods beam, which has been loaded with a polyamide-6 loop pile carpet of 50 cm width, 135 cm length, and a weight of 380 g, is introduced into the dyeing apparatus. 6 liters of softened water are filled into he expansion tank and 60 ml of 2N sodium hydroxide solution are added. After the appropriate valves (expansion tank, or connection tubings, pump/dyeing kier) have been opened, the liquor flows under its own weight from the expansion tank into the dyeing kier, the displaced air escaping via the de-aerating tube into the expansion tank. After the dyeing apparatus has been filled, some of the liquor, to a height of about 5 cm, remains in the expansion tank; then the circulation pump is switched on. In order to control the pH value a hole was drilled into the tube connecting the dyeing kier to the expansion tank (in the direction of flow) and a combined glass electrode was introduced. Throughout the whole dyeing process the dye liquor circulates from inside to outside, the pressure differential being 0.1 to 0.2 bar, and the pump delivery being about 6 liters per minute. The liquor is heated to 98° and 7.6 g of an anionic levelling agent, which has affinity for the fibre, dissolved in 100 ml of water, are added to the expansion tank within 5 minutes.

The dyeing temperature is set at 97° to 98°, the pH value being 10.7. The pH value of a sample which has been cooled to 20° is 11.9.

Now 2.5 g of the yellow dye of Example 1 and 1.8 g of the blue dye of the formula

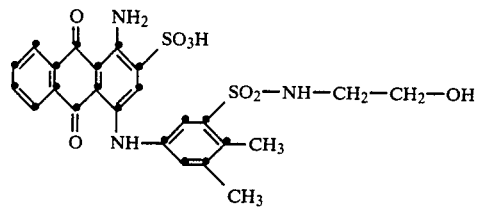

both dissolved in 200 ml of hot water, are allowed to run into the expansion tank via a tap funnel within 10 minutes. After 30 minutes a total of 100 ml of 1N sulfuric acid are dosed in via a bulb burette for 10 minutes at a rate of 5.5 ml per minute and for a further 20 minutes at a rate of 2.25 ml per minute.

After a further 10 minutes the pH value is 3.8. The dye bath is exhausted, i.e. over 99% of the dyes have been taken up by the goods. The heating is switched off and the dye liquor cooled down to 60° by means of indirect cooling. During this time the pH value increases to 3.9. The liquor, nearly as clear as water, is pumped back into the expansion tank and the goods beam is removed. The carpet material is wound off, centrifuged and dried. The polyamide-6 loop pile carpet is dyed levelly green.

Dyeing instruction IV (Carpet printing)

A velour floor covering of polyamide-6 with a weight of 350 to 400 g/m² is soaked with a padding liquor consisting of 988 parts of water, 10 parts of sodium hydroxide solution of 36° Bé and 2 parts of wetting agent, on a pad mangle and then squeezed to a liquor take-up of 80%.

A dye paste of the following composition is sprayed with a nozzle in the shape of a pattern onto the pretreated carpet: 942 parts of water, 50 parts of thickener, 3 parts of antifoaming agent, 3 parts of the yellow dye of Example 1, 1 part of the red dye of Example 5 and 1 part of the blue dye of the formula

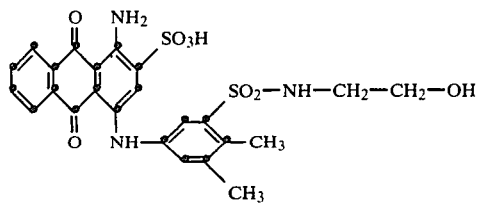

The thickener used has the following composition: 240 parts of white spirit, 50 parts of water-in-oil emulsifier, 20 parts of oil-in-water emulsifier, 20 parts of antifoaming agent, 50 parts of crosslinked carboxyvinyl polymer with a molecular weight of about 4,000,000, 70 parts of linear carboxyvinyl polymer with a molecular weight of about 1,000,000 and 550 parts of water, the pH value of which has been set at 4.5 with acetic acid.

The material which has been sprayed with the dye paste is subsequently treated with saturated steam at 101° for 5 minutes in order to fix the dyes, rinsed, neutralised, rinsed again and dried.

A velour floor covering is obtained with a brown pattern with very well delineated contours, which shows very good penetration and no frosting whatsoever.

Dyeing instruction V (Continuous carpet dyeing)

3.32 parts of the yellow dye of Example 1 and 11.2 parts of the blue dye of the formula

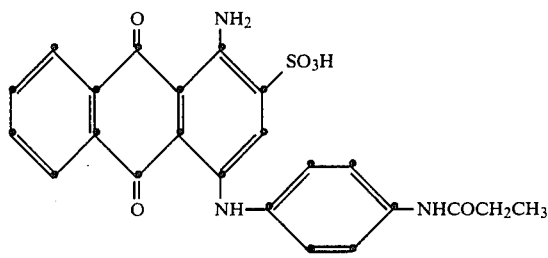

are dissolved in 100 parts of water by a brief period of boiling. This solution is then added to a solution which contains 3 parts of a thickening agent based on carob bean flour, 5.0 parts of a coacervate-forming padding auxiliary agent based on the condensation product of a higher molecular fatty acid with an oxyalkylamine, 2.0 parts of crystalline monosodium phosphate and 1.0 part of crystalline disodium phosphate in 500 parts of cold water. Then the solution is topped up to 1,000 parts with cold water. This liquor, which has a pH value of 5.5 to 6.5, is applied at 300%, based on the carpet weight, on an unfinished tufted nylon carpet, at a carpet speed of 8 meters per minute. The soaked carpet carries on into a loop steamer, where it is treated with saturated steam at 98° to 100° for 10 minutes.

Uniformly green dyed carpet is obtained after washing in a full width rinse machine.

Dyeing instruction VI (Continuous wool dyeing)

A wool fabric is padded with a liquor containing 2.6 parts of the yellow dye of Example 1, 5.2 parts of the red dye of the formula

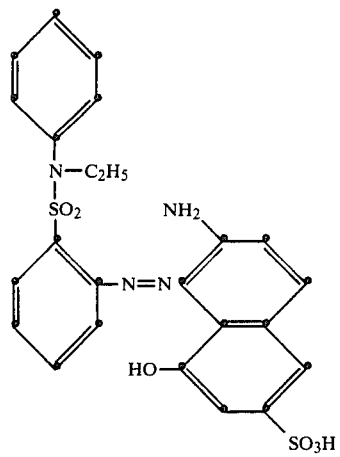

15.7 parts of the blue dye the formula of which was given in dyeing instruction V, 2.0 parts of a thickening agent based on alginate, 22.0 parts of a coacervate-forming padding agent based on the condensation product of a higher molecular fatty acid with an oxyalkylamine and 8.0 parts of 80% formic acid in 1,000 parts of water, a liquor take-up of 85%, based on the weight of the wool being achieved. Subsequently the carpet is steamed in saturated steam at 98° to 100° for 15 minutes and then washed. A uniform olive dyeing is obtained.

Dyeing instruction VII (Automated dyeing)

A concentrated mother liquor is prepared which consists of 24 parts of the dye of Example 5, 10 parts of the blue dye of which the formula was given in dyeing instruction V, 50 parts of a levelling agent based on sodium dodecylbenzenesulfonate and highly sulfonated castor oil, and 50 parts of 60% acetic acid, dissolved in 1,000 parts of water. This mother liquor is introduced into a dyeing apparatus for automated dyeing and is then automatically diluted for each dyeing cycle 100-fold (or, if so desired, for example, 50- or 200-fold).

Unfinished nylon piece goods (for example, men's socks), which have been drawn over flat shapes, are then uniformly sprayed with the resulting diluted solution in the dyeing chambers of this apparatus. The drained liquor is collected at the bottom of the dyeing chambers and is sprayed again as part of the circulation cycle.

At the end of 8 minutes' dyeing time, during which 1.2 liters of liquor were in circulation per unit of goods (for example, men's socks), at a liquor temperature of 95°, the liquor is dropped and the goods are rinsed with hot water. The goods are then fixed on the formers using 3 injections of superheated steam at 115°, between each two of which the goods are aired and evacuated, and dried.

What is claimed is:

1. A monoazo dye of the formula

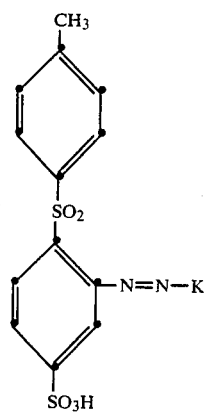

in which K is a radical of the formula

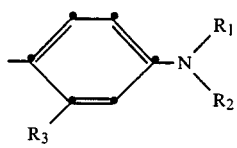

or of the formula

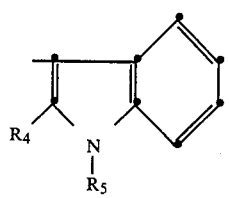

in which $R_1$ and $R_2$ independently of one another are (1) hydrogen, (2) $C_{1-4}$-alkyl which is unsubstituted or is substituted by halogen, cyano, hydroxyl, carboxyl, sulfo, sulfato, $C_{1-4}$-alkoxy, $C_{1-4}$-alkoxycarbonyl, $C_{1-4}$-alkanoyloxy, phenyl, sulfophenyl or naphthyl, (3) cyclohexyl, (4) $C_{1-4}$-alkenyl which is unsubstituted or is substituted by halogen, (5) phenyl, (6) naphthyl, or (7) $R_1$ and $R_2$ together with the nitrogen atom to which they are attached form a heterocyclic 5-membered or 6-membered ring, $R_3$ is (1) hydrogen, (2) $C_{1-4}$-alkyl, (3) $C_{1-4}$-alkoxy which is unsubstituted or is substituted by hydroxyl or $C_{1-4}$-alkoxy, (4) $C_{1-4}$-alkanoylamino, (5) benzoylamino which is unsubstituted in the benzene nucleus or is substituted therein by methyl, ethyl, methoxy, ethoxy, chlorine, carboxyl or sulfo, (6) ureido, (7) $C_{1-4}$-alkylsulfonylamino, or (8) phenylsulfonylamino which is unsubstituted or is substituted in the benzene nucleus by methyl, ethyl, methoxy, ethoxy, chlorine, carboxyl or sulfo, or (9) naphthylsulfonylamino, $R_4$ is methyl or phenyl and $R_5$ is hydrogen or $C_{1-8}$-alkyl, and in which, if K is the radical of the formula (2), $R_3$ may not be hydrogen if $R_1$ or $R_2$ is benzyl.

2. A monoazo dye according to claim 1, in which K is the radical of the formula (2), in which $R_1$ and $R_2$ independently of one another are (1) hydrogen, (2) $C_{1-4}$-alkyl which is unsubstituted or is substituted by cyano, hydroxyl, sulfo, sulfato, $C_{1-4}$-alkoxy, $C_{1-4}$-alkoxycarbonyl, $C_{1-4}$-alkanoyloxy, phenyl or sulfophenyl, (3) cyclohexyl, (4) $C_{1-4}$-alkenyl which is unsubstituted or is substituted by halogen, or (5) $R_1$ and $R_2$, together with the nitrogen atom to which they are attached, form a morpholine ring, and $R_3$ is (1) hydrogen, (2) $C_{1-4}$-alkyl, (3) $C_{1-4}$-alkoxy which is unsubstituted or is substituted by hydroxyl or $C_{1-4}$-alkoxy, (4) $C_{1-4}$-alkanoylamino, (5) benzoylamino which is unsubstituted in the benzene nucleus or is substituted therein by methyl, chlorine or carboxyl, (6) ureido, (7) $C_{1-4}$-alkylsulfonylamino, or (8) phenylsulfonylamino, which is unsubstituted in the benzene nucleus or is substituted therein by methyl, and in which $R_3$ may not be hydrogen if $R_1$ or $R_2$ is benzyl.

3. A monoazo dye according to claim 1 in which K is the radical of the formula (3), in which $R_4$ is methyl or phenyl and $R_5$ is hydrogen, methyl or octyl.

4. A monoazo dye according to claim 2, in which K is a radical of the formula (2), in which $R_1$ and $R_2$ independently of one another are hydrogen, methyl, ethyl, β-hydroxyethyl, β-cyanoethyl, β-sulfoethyl, β-sulfatoethyl, γ-sulfopropyl, β-hydroxy-γ-sulfopropyl, propenyl, γ-chloropropenyl, β-hydroxybutyl, β-hydroxy-γ-methoxypropyl, β-acetoxyethyl, β-methoxycarbonylethyl, β-propionyloxyethyl, cyclohexyl, benzyl or sulfobenzyl, or in which $R_1$ and $R_2$, together with the nitrogen atom to which they are attached, form a morpholine ring, and $R_3$ is methyl, ethyl, methoxy, ethoxy, β-hydroxyethoxy, β-hydroxypropoxy, β-hydroxy-γ-methoxypropoxy, β-hydroxybutoxy, acetylamino, propionylamino, benzoylamino, methylbenzoylamino, chlorobenzoylamino, carboxybenzoylamino, methylsulfonylamino, phenylsulfonylamino, methylphenylsulfonylamino or ureido.

5. The monoazo dye according to claim 3 of the formula

6. The monoazo dye according to claim 4 of the formula (5)
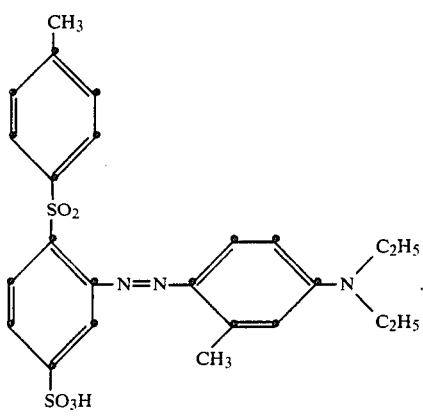
7. The monoazo dye according to claim 2 of the formula
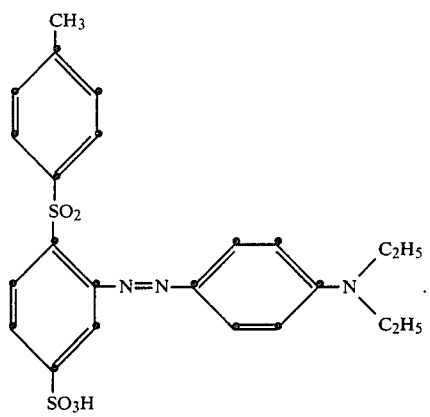
(5a)
8. The monoazo dye according to claim 4 of the formula
(6)
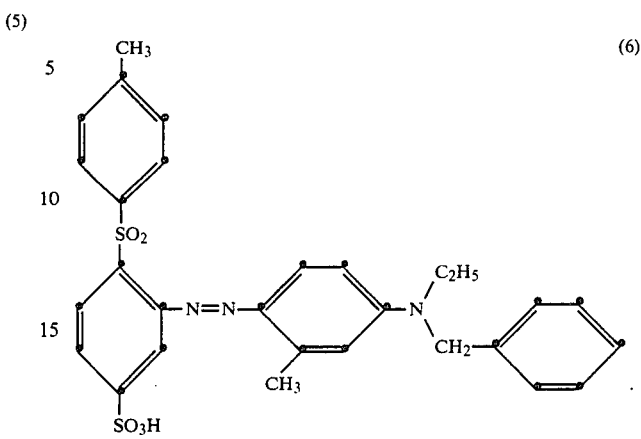
9. The monoazo dye according to claim 4 of the formula
(6a)
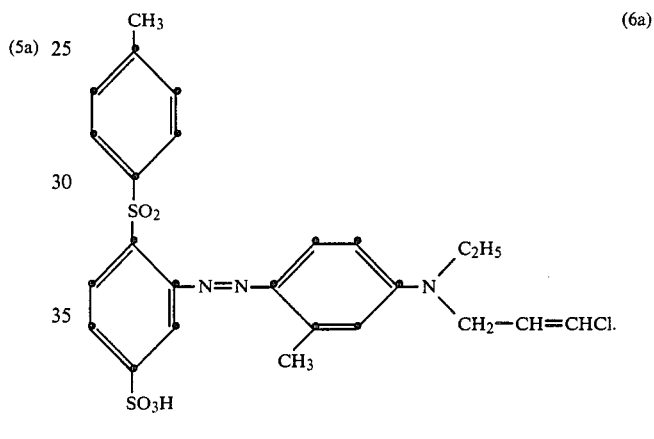
* * * * *